US006687684B1

(12) United States Patent

Whitehouse et al.

(10) Patent No.: US 6,687,684 B1

(45) Date of Patent: Feb. 3, 2004

(54) SYSTEM AND METHOD FOR RESTRICTIVELY AUTHORIZING REPRINTING OF MAIL PIECES HAVING POSTAGE INDICIA

(75) Inventors: Harry T. Whitehouse, Portola Valley, CA (US); Scott T. Montgomery, Los Altos, CA (US)

(73) Assignee: PSI Systems, Inc., Palo Alto, CA (US)

( * ) Notice: Subject to any disclaimer, the term of this patent is extended or adjusted under 35 U.S.C. 154(b) by 0 days.

(21) Appl. No.: 09/329,551

(22) Filed: Jun. 10, 1999

(51) Int. Cl.[7] .............................................. G06F 17/00

(52) U.S. Cl. ...................................... 705/408; 235/345

(58) Field of Search ................................ 705/401–407, 705/408–418, 500, 60–63; 235/375, 380; 714/2, 8

(56) References Cited

U.S. PATENT DOCUMENTS

| | | | | |
|---|---|---|---|---|
| 5,715,164 A | * 2/1998 | Liechti et al. | ........... | 364/464.2 |
| 5,745,590 A | * 4/1998 | Pollard | ....................... | 382/101 |
| 5,778,066 A | * 7/1998 | Shah et al. | .................... | 380/24 |
| 5,822,738 A | * 10/1998 | Shah et al. | ................. | 705/410 |
| 5,822,739 A | * 10/1998 | Kara | .......................... | 705/410 |
| 6,240,403 B1 | * 5/2001 | Shah et al. | ................. | 705/408 |
| 6,269,350 B1 | * 7/2001 | Shah et al. | ................. | 705/410 |

FOREIGN PATENT DOCUMENTS

JP 402033715 A * 2/1990

OTHER PUBLICATIONS

State of Affairs Postage Meters; Jan. 1998; ISSN: 01645951.*

* cited by examiner

*Primary Examiner*—James P. Trammell
*Assistant Examiner*—Pierre E. Elisca
(74) *Attorney, Agent, or Firm*—Gary S. Williams; Pennie & Edmonds LLP

(57) ABSTRACT

A postage printing system enables users to generate postage indicia and print mail pieces at client computers. Upon user determination of a mail piece print failure, a mail metering application on the client computer sends reprint request to an authorizing authority at a remote location. The reprint request includes information identifying an account for printing a postage indicia. A server computer used by the authorizing authority receives the reprint request from a client computer and evaluates the request. When the account is verified and other criteria are satisfied, a reply is sent to the client computer that includes a reprint authorization. Otherwise, a negative reply is sent to the client computer that does not include the reprint authorization. Upon receiving a reprint authorization from the authorizing authority, the client computer prints a replacement mail piece with the postage indicia. The mail metering application prevents the user from reprinting the mail piece when a reprint authorization is not received from the authorizing authority.

18 Claims, 5 Drawing Sheets

SYSTEM AND METHOD FOR RESTRICTIVELY AUTHORIZING REPRINTING OF MAIL PIECES HAVING POSTAGE INDICIA

The present invention relates generally to computer based postage mail piece printing systems, and particularly to a system for handling reprints of mail pieces required by mail piece printing errors.

BACKGROUND OF THE INVENTION

Postage metering systems, generally speaking, require an account, a printing machine for printing a valid postage stamp (indicium), a method or mechanism for debiting the account according to the amount of postage printed and a mechanism for resetting and/or paying the account. In one system, a person must manually set a metering machine to allow printing of a certain cumulative value of postage according to the amount desired and paid for by the user, $100 for example. The machine is used to print postage as needed until the amount, $100 in this example, has been expended. Whenever more postage is desired the metering machine must be taken to the post office and physically reset upon payment of the desired postage. Additionally, if postage is printed by mistake or unuseable postage is printed, the unused postage must be brought to the post office for credit. Some postage meters of this general type include a modem and a mechanism to purchase postage through a telephone link to the postal authority.

Another system allows the use of a computer and printer to print valid postage directly on a mail piece and to remotely purchase the postage through a communications link to a center authorized by the relevant postal authority (e.g., the United States Postal Service (USPS) in the United States). The postage is printed as a two dimensional bar code or postage indicia directly on the mail piece, which indicia contains the amount of postage, a unique authorization number and other pertinent information, such as the addressee, street, state, ZIP+4+2 code and country for example.

Metering discrete postage amounts is accomplished by either a secured memory module local to the user's computer or a remote secured memory module stored in the authorized center. Each time the user prints an indicia the requisite amount of postage is debited from the user's account, whether the account be local or remote. Additional postage may be added to a user's account by remotely or locally updating the user's memory module (local or remote module) upon payment. Unlike previous systems, this system allows printing the postage and additional useful information directly on the mail piece in the form of an easily readable two dimensional bar code. However, this system is prone to even more errors in printing postage than previous systems. For example, in addition to user "mistakes", use of a printer may result in printing on the wrong media, a sheet of paper rather than an envelope for example, or in media jams within the printer, thereby rendering the postage indicia unuseable.

Another system, used by some express shippers, allows a user to print a shipping label, a one-dimensional bar code, directly from a local printer. The user's computer is connected to the system through the internet and the appropriate charges are made to the user's account for all printed labels. If a printed label will not be used, for whatever reason, the user notifies the shipper by computer or phone, and the shipper cancels the label by voiding the unique bar code number assigned to the unwanted shipping label, rendering the unwanted label useless. Shipping companies can use this system with minimal concerns for fraud because each shipping label is entered and tracked from pick-up to delivery. However, the number of mail pieces shipped by the USPS is of such a scale that tracking each piece is impractical.

Accordingly, it is an object of the present invention to provide a system and method for remotely requesting and receiving authorization for reprinting unuseable postage indicia. It is a further object of the present invention to provide this system and to ensure sufficient fraud protection without the need for tracking every mail piece.

SUMMARY OF THE INVENTION

In summary, the present invention is a postage printing system that enables users to generate postage indicia and print mail pieces at client computers. Upon user determination of a mail piece print failure, a mail metering application on the client computer sends a reprint request to an authorizing authority at a remote location. Upon receiving a reprint authorization from the authorizing authority, the client computer prints a replacement mail piece with the postage indicia. The mail metering application prevents the user from reprinting the mail piece when a reprint authorization is not received from the authorizing authority.

A server computer used by the authorizing authority receives the reprint request from a client computer. The request includes information identifying an account for printing postage indicia. The server computer has a reprint authorization procedure that evaluates the request, including verifying that said account is valid. When the account is verified and other criteria are satisfied, a reply is sent to the client computer that includes a reprint authorization. Otherwise, a negative reply is sent to the client computer that does not include the reprint authorization. The criteria applied to the reprint request may include a limit on the number of reprint requests to be authorized for the account during a predefined time period, and/or a cumulative monetary limit on reprint requests to be authorized for the account during a predefined time period.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
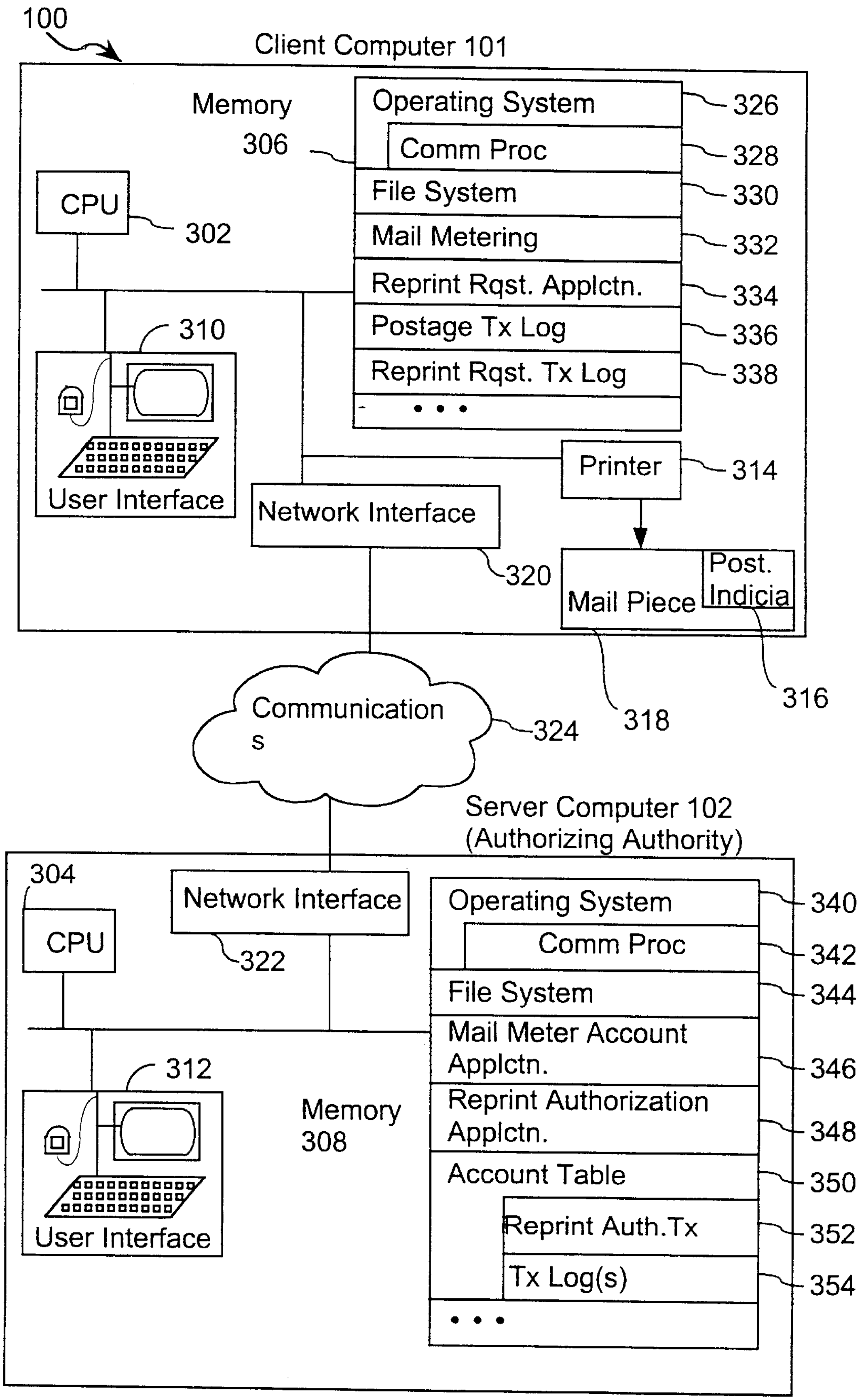
FIG. 1 is a block diagram of a postage reprint authorization system in accordance with an embodiment of the present invention.

Referring to FIG. 1, there is shown a remote postage metering system 100 with the capability to make requests for and to grant a reprint authorization for postage indicia print failures. A postage indicia print failure may include without limitation a mistake in the printed indicia (e.g., incorrect address or incorrect postage), damaged indicia (e.g., media jam) or otherwise unusable indicia (e.g., incorrect media). Thus, a reprint request and authorization therefor may run the spectrum from reprinting the same indicia (i.e., without changes) to printing an entirely new indicia (i.e., changes to all information). The system preferably includes:

client computer 101 and server computer 102;

client CPU 302, and server CPU 304;

client memory 306 and server memory 308 client input/output system 310 and server input/output system 312;

client printer 314 for printing authorized postage indicia 316 on mail piece 318;

client network interface 320 and server network interface 322; and communications network 324 (a private network, local or national telecommunications network or the internet, for example) connecting client computer 101 to server computer 102.

Client Memory 306 Includes:

operating system 326, including communication procedure 328 for handling communications on behalf of the client between the client and server computers 101, 102;

a file system 330 for controlling access to and storing of files;

mail metering application 332, which represents a software module having instructions for generating and printing postage indicia 316 on mail piece 318;

reprint request application 324, which represents a software module having instructions for requesting and receiving authorization to reprint print failures;

postage transaction log 326, which contains records of all the printed postage indicia; and reprint request transaction log 338, which contains records for all reprint requests submitted by the client 101 to the server 102.

Server Memory 308 Includes:

operating system 340, including communication procedure 342 for handling communications on behalf of the server between the client and server computers 101, 102;

file system 344 for controlling access to and storing of files;

mail metering account application 346, which works in conjunction with the client mail metering application 332 to manage the generation and printing of postage indicia 316 and to manage the account therefor;

reprint authorization application 348, which works in conjunction with the client reprint request application 334 to authorize or deny reprint requests; and account table 350, which contains entries for each client account including a reprint authorization transaction log 352 and other transaction log(s) 354.

Referring to FIG. 1, a user launches mail metering application 332, which prompts the user to input information for printing a postage indicia 316 on a mail piece 318. The user verifies the information, and then the mail metering application generates the postage indicia and prints that postage indicia 316 on mail piece 318 using an attached or networked printer 314. Mail metering application 332 then debits the user's account by the amount of postage printed and saves the information of each printed indicia to postage transaction log 336. In some implementations, the account balance from which the postage amount is debited is maintained securely by a device attached to the client computer. In other implementations, the account balance is maintained securely by a remote computer, in which case the client computer must communicate with the remote computer each time a new postage indicia is generated.

Figure 2:
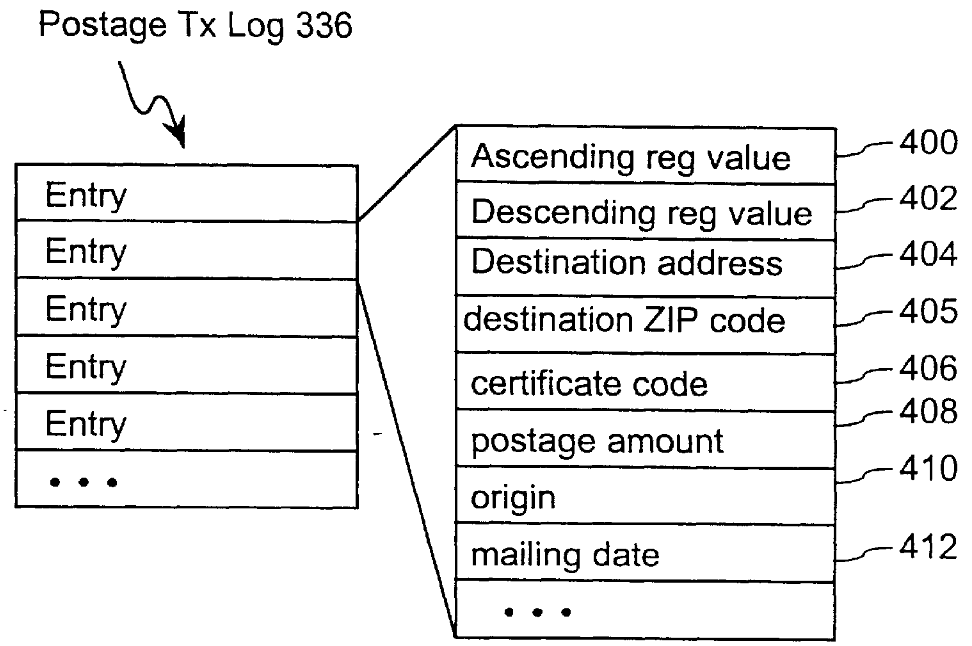
FIG. 2 is a block diagram of a postage transaction log and an entry therein.

Referring to FIG. 2, each entry of postage transaction log 336 and thus each postage indicia 316 includes, by way of example, the following information:

ascending register of the account 400 descending register of the account 402;

destination address 404;

destination ZIP code (5+4+2) 405;

certificate code 406, which is the X509 certificate for the account (this item will typically be included in the postage indicia 316, but not the log entry, because it is always the same);

amount of postage 408;

origination information (ZIP code and address for example) 410; and date of mailing 412.

Additionally, the printed postage indicia 316 may also include the meter/account number for identification purposes. The skilled artisan will recognize the above list may be varied without deviating from the scope of the present invention.

Referring again to FIG. 1, if there is a postage indicia print failure, the user launches reprint request application 334. As described herein, reprint request application 334 is a separate application; however, the skilled artisan will readily recognize it may be imbedded or otherwise incorporated with mail metering application 332 or other applications without deviating from the scope of the present invention.

Figure 3:
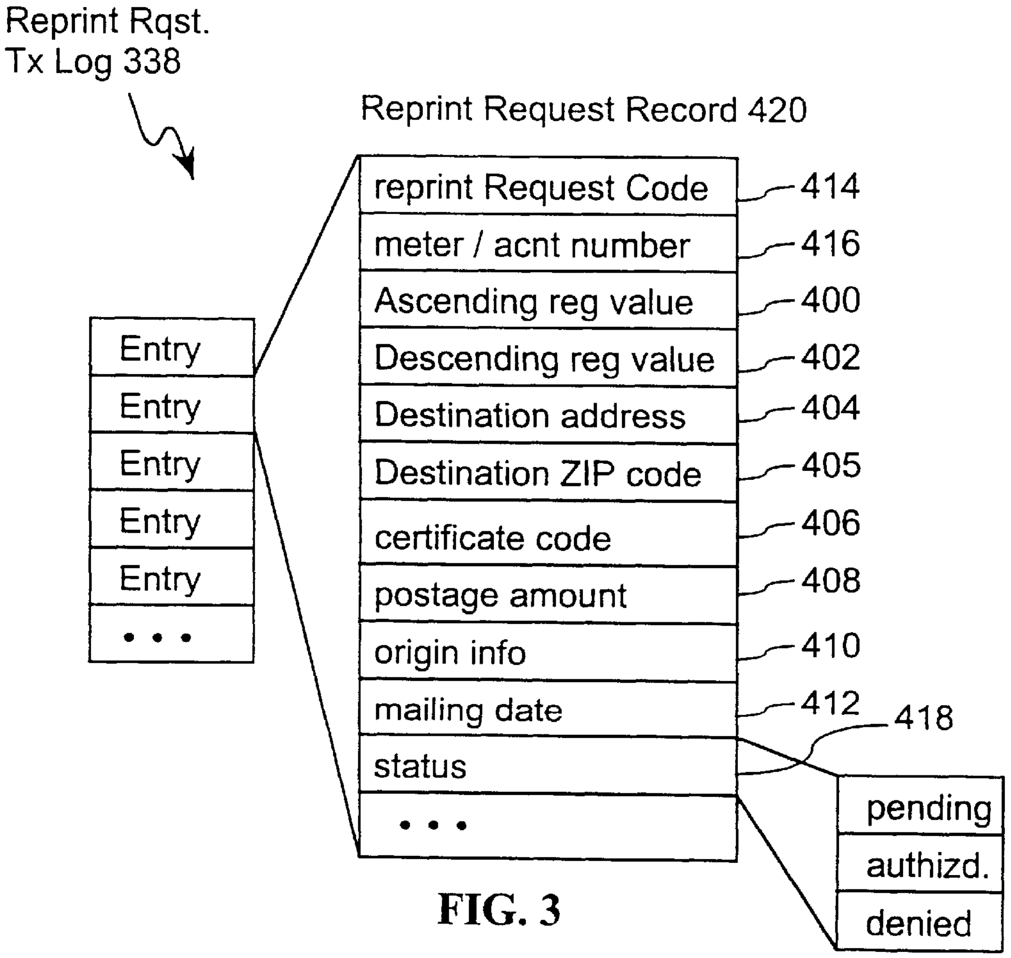
FIG. 3 is a block diagram of a reprint transaction log and an entry therein for a reprint request.
Figure 4:
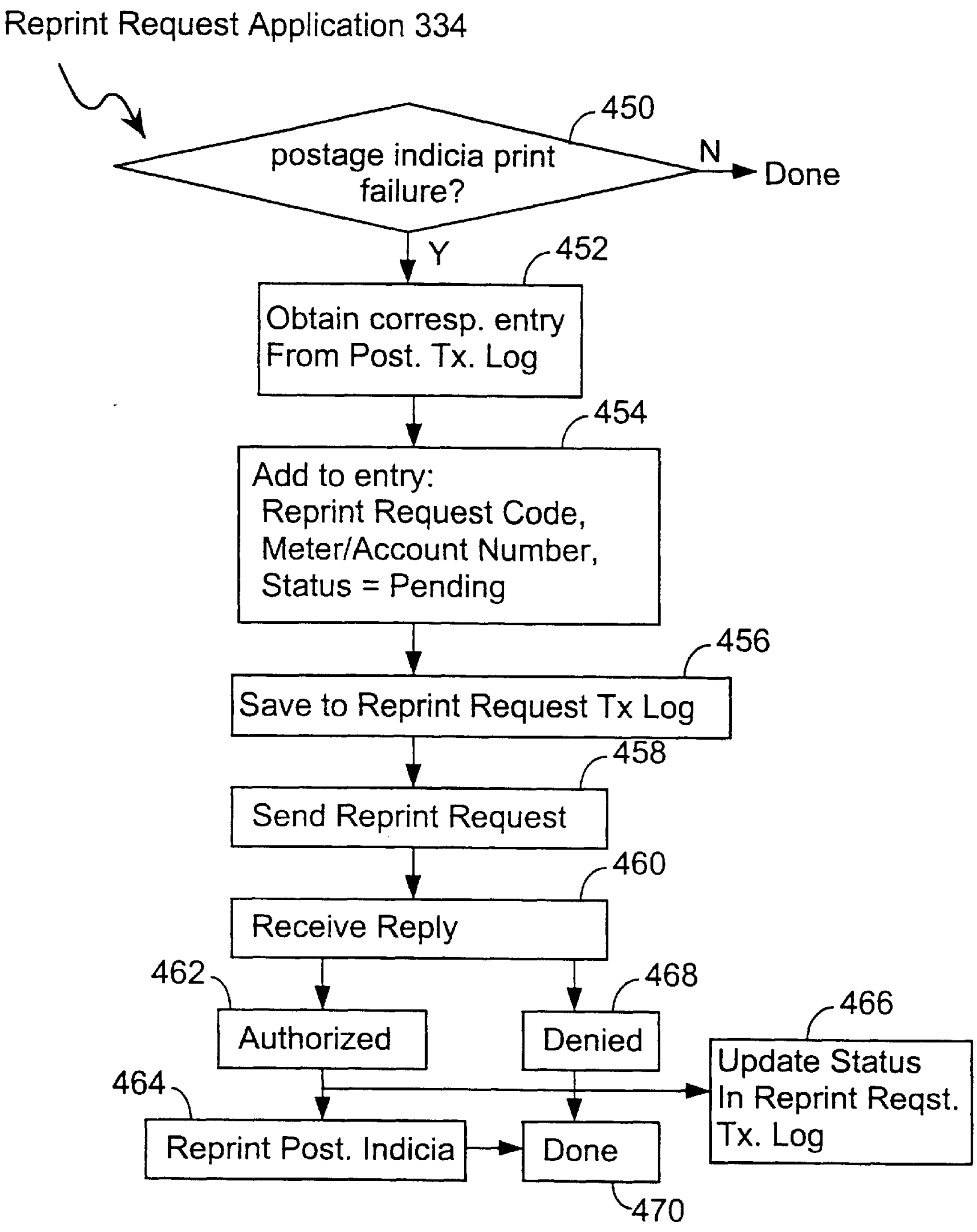
FIG. 4 is a flow chart showing the procedure utilized by the reprint request application in accordance with an embodiment of the present invention.

Referring to FIG. 4, reprint request application 334 first determines whether there has been a postage indicia print failure (450), for example by asking the user to confirm that a postage indicia print failure has occurred. If not, the application is completed. If a postage indicia print failure has occurred, the corresponding entry from postage transaction log 336 is copied (452); a reprint request code 414, the user's meter/account number 416 and a status field 418 are attached (454) to establish a reprint request record 420 (FIG. 3); and the status field 418 is set to pending. The reprint request record 420 is saved (456) to the reprint request transaction log 338 (FIG. 3); reprint request record 420 is sent to the authorizing authority (458), via communications network 324; and a reply from the same is received (460).

If the request is authorized (462) the status of reprint request record 420 is changed to authorized (466). A unique authorization code from the authorizing authority may be attached to the reprint request record 420. The postage indicia 316 is reprinted (464); and reprint request application 334 is completed (470). As discussed above, the reprinted postage indicia may include no, few or many changes to the information contained therein. Additionally, the reprinted postal indicia may include the unique authorization code and/or the reprint request code for use by the postal authority to prevent fraudulent behavior. For example, the postal authority could scan each mail piece for the unique code and cross check to verify that the original indicia was not also used.

If the request is denied (468), the status of reprint request record 420 is changed to denied (466) and reprint request application 334 is completed (470).

Figure 5:
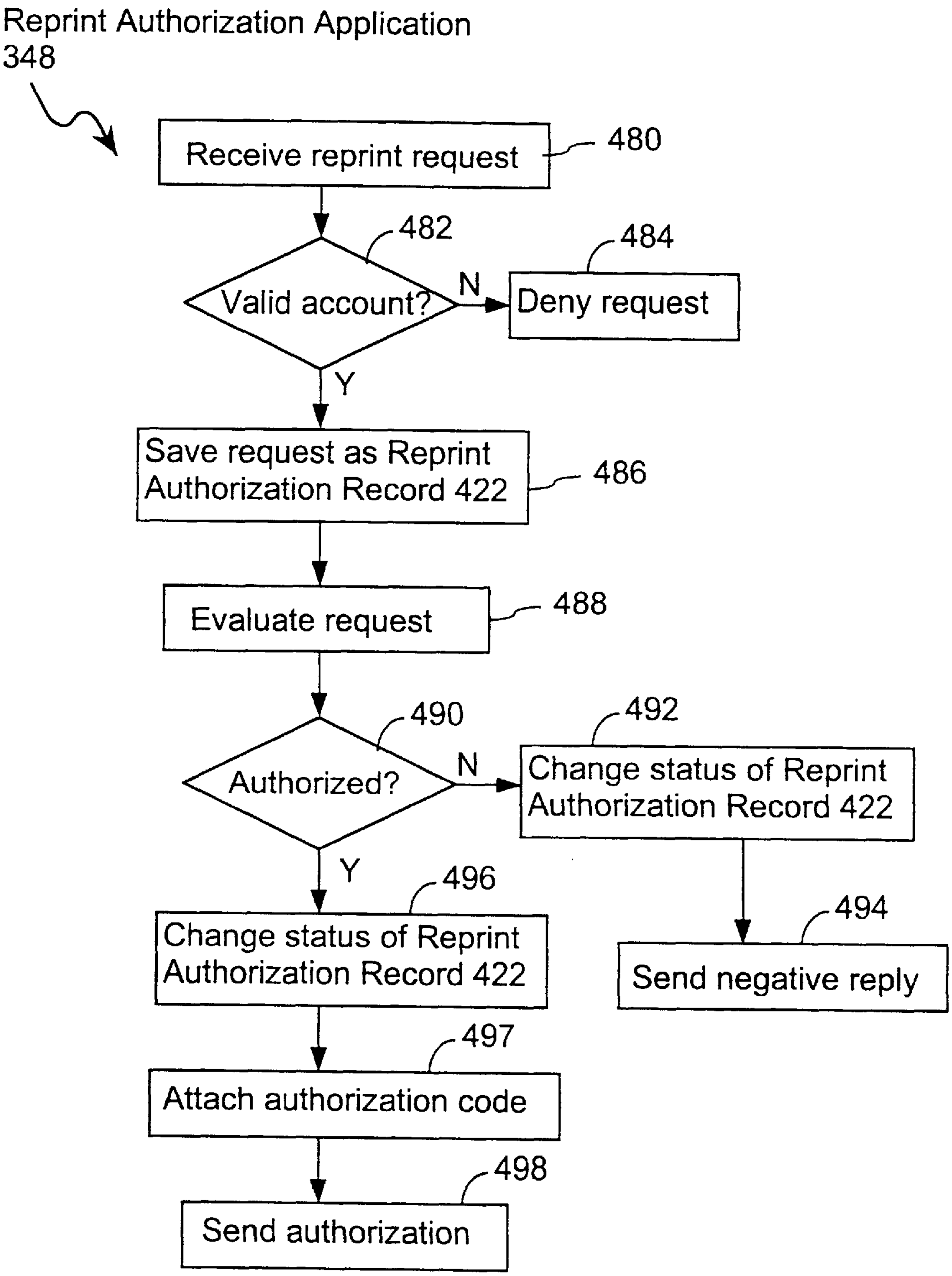
FIG. 5 is a flow chart showing the procedure utilized by the reprint authorization application for authorizing or for denying a reprint request in accordance with an embodiment of the present invention.
Figure 6:
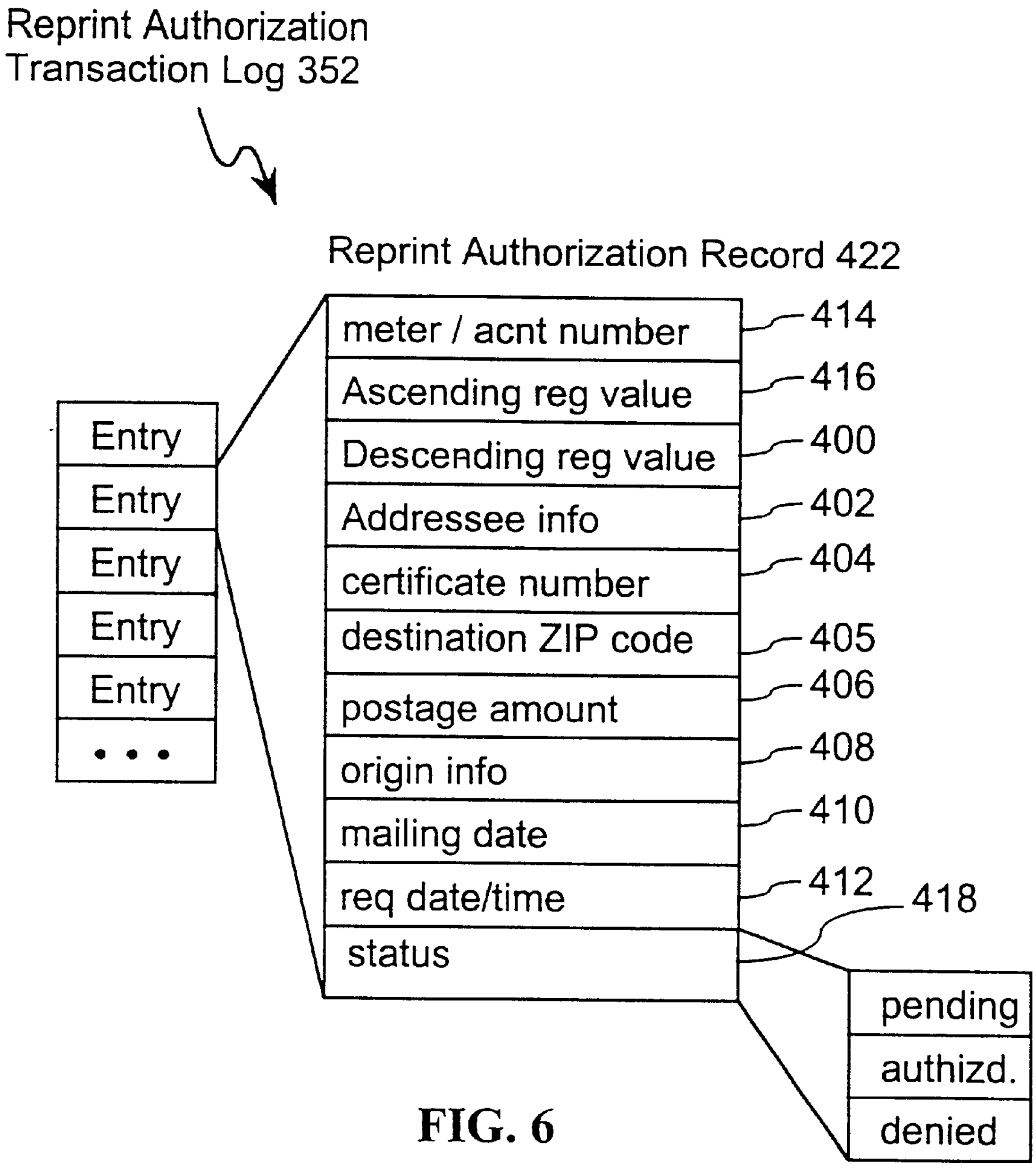
FIG. 6 is a block diagram of an entry in the server computer reprint authorization transaction log.

Referring to FIG. 5, reprint authorization application 340 authorizes or denies the reprint request and may initiate an audit of the user. Request record 420 is received (480) and the user's account is validated (482). The request authorizing authority may be the vendor of the metering services, the postal authority or company (e.g., the USPS) or a third party independent from either the postal authority or the vendor of the metering services. Thus, the account authorization may be as simple as referring to an internal account data base or remotely accessing the data base of a third party, i.e., the postal authority or the vendor of the metering services. If the account is invalid the request is automatically denied (484). If the account is valid, the reprint authorization application 348 saves the received request as a reprint authorization record 422 in reprint authorization transaction log 352 (486) (see FIG. 6) and evaluates the request (488).

Evaluation of the request may include, by way of example, comparing the number, or frequency, or other characteristic of the reprint requests made by a particular user against one or more threshold values. More generally, any number of predefined evaluation criteria may be applied to each received reprint request. If any of the applicable thresholds are not met, or any of the evaluation criteria are not satisfied, the status of reprint authorization record 422 is changed to denied (492), and a denial is sent back to the user (494). If none of the applicable thresholds are exceeded, the status of the reprint authorization record 422 is changed to authorized (496), and an authorization is sent back to the user (498), which may include a unique authorization code attached thereto (497). The unique authorization code may be used by the USPS for prevention of fraud.

A skilled artisan will readily recognize the threshold(s) used to determine whether a reprint request should be authorized may be established according to many methods. For example, a threshold may be a stochastically determined expected value (i.e., expected number of reprint requests) for a particular user, which value may be based on historical data such as mail volume of a user (or a group representative of a user), industry of a user, size of a user and/or other parameters well known to the skilled artisan. The thresholds applied to a reprint request may include, for example, a limit on the number of reprint requests that will be authorized for a particular account during a predefined time period (e.g., a month), and a cumulative monetary limit on the amount of postage in authorized postage indicia reprints during a particular time period. Other criteria applied to each reprint request may include an analysis of the return and destination addresses, including a comparison of those addresses with previous return and destination addresses used on mail pieces by the account.

The evaluation process may serve to prevent fraudulent behavior. For example, the evaluation process may trigger an audit of a user and/or a report to the postal authority based on the number of and/or frequency of reprint requests as compared to the threshold. The audit or report may be triggered using the same or different threshold(s) as used to provide or deny reprint authorization. Additionally, it is believed that users knowing reprint request histories are recorded and tracked will be dissuaded from fraudulent behavior. Therefore, the current invention provides a system for reducing the incidence of fraud without the need for tracking each postal indicia. Alternatively, the postal authority could scan each mail piece for indicia having reprint authorization and verify that the original indicia was not also used, as discussed above.

Alternate Embodiments

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

Therefore, the current invention provides a system for permitting a user of remote and/or electronic (digital) postage metering systems to obtain reprint authorization for postage indicia print failures. Furthermore, an embodiment of the system in accordance with the present invention reduces the incidence of fraud without the need for tracking each postage indicia passed through the postal authority. An alternative embodiment of the present invention may provide fraud reduction by scanning each postage indicia for reprint authorization codes.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer implemented method to enable a user to reprint a postage indicia at a client computer, comprising:

generating a postage indicia;

printing a mail piece with said indicia thereon;

upon user determination of a mail piece print failure, sending a reprint request to an authorizing authority at a remote location;

upon receiving a reprint authorization from the authorizing authority, enabling the user to print a replacement mail piece with the postage indicia; and preventing reprinting of the mail piece when a reprint authorization is not received from the authorizing authority;

wherein the reprint authorization from the authorizing authority is denied when, upon evaluation of the reprint request by the authorizing authority, the reprint request is determined to not satisfy at least one of a plurality of criteria, the plurality of criteria including an account verification criterion and a reprint limit criterion, the reprint limit criterion comprising a limit on reprint requests to be authorized for an account associated with the user during a predefined time period.

2. The method of claim 1, the postage indicia indicating a monetary quantity, the method including deducting the monetary quantity from an account balance.

3. The method of claim 2, wherein the account balance is maintained securely by the client computer.

4. The method of claim 2, wherein the account balance is maintained securely a remote computer.

5. The method of claim 1, wherein the reprint request includes information identifying an account of a party authorized to print mail pieces having a respective postage indicia.

6. A computer implemented method to enable a user to reprint a postage indicia at a client computer, comprising:

receiving a request from a client computer for authorization to reprint a mail piece that includes a postage indicia, wherein the request includes information identifying an account for printing postage indicia;

evaluating the request, including verifying that said account is valid; and sending a reply to the client computer that includes a reprint authorization when the account is verified and other criteria are satisfied, and otherwise sending a negative reply to the client computer that does not include the reprint authorization;

the evaluating step including applying the other criteria to the request, the other criteria including a limit on reprint requests to be authorized for the account during a predefined time period.

7. The method of claim 6, wherein the evaluating step includes looking up the account in a table of authorized accounts.

8. A computer implemented method to enable a user to reprint a postage indicia at a client computer, comprising:

receiving a request from a client computer for authorization to reprint a mail piece that includes a postage indicia, wherein the request includes information identifying an account for printing postage indicia;

evaluating the request, including verifying that said account is valid; and sending a reply to the client computer that includes a reprint authorization when the account is verified and other criteria are satisfied, and otherwise sending a negative reply to the client computer that does not include the reprint authorization;

the evaluating step including applying the other criteria to the request, the other criteria including a cumulative monetary limit on reprint requests to be authorized for the account during a predefined time period.

9. The method of claim 8, wherein the evaluating step includes looking up the account in a table of authorized accounts.

10. A computer program product for use in conjunction with a computer system, the computer program product comprising a computer readable storage medium and a computer program mechanism embedded therein, the computer program mechanism comprising:

a mail metering module that includes instructions for:

generating a mail piece that includes a postage indicia;

printing the mail piece;

upon user determination of a mail piece print failure, sending a reprint request to an authorizing authority at a remote location;

upon receiving a reprint authorization from the authorizing authority, enabling the user to print a replacement mail piece with the postage indicia; and preventing reprinting of the mail piece when a reprint authorization is not received from the authorizing authority;

wherein the reprint authorization from the authorizing authority is denied when, upon evaluation of the reprint request by the authorizing authority, the reprint request is determined to not satisfy at least one of a plurality of criteria, the plurality of criteria including an account verification criterion and a reprint limit criterion, the reprint limit criterion comprising a limit on reprint requests to be authorized for an account associated with the user during a predefined time period.

11. The computer program product of claim 10, the postage indicia indicating a monetary quantity, the mail metering module including instructions for deducting the monetary quantity from an account balance.

12. The computer program product of claim 11, wherein the account balance is maintained securely by the client computer.

13. The computer program product of claim 11, wherein the account balance is maintained securely a remote computer.

14. A computer program product for use in conjunction with a computer system, the computer program product comprising a computer readable storage medium and a computer program mechanism embedded therein, the computer program mechanism comprising:

a reprint authorization module that includes instructions for:

receiving a request from a client computer for authorization to reprint a mail piece that includes a postage indicia, wherein the request includes information identifying an account for printing postage indicia;

evaluating the request, including verifying that said account is valid;

sending a reply to the client computer that includes a reprint authorization when the account is verified and other criteria are satisfied, and otherwise sending a negative reply to the client computer that does not include the reprint authorization;

wherein the request evaluating instructions in the reprint authorization module include instructions for applying the other criteria to the request, the other criteria including a limit on reprint requests to be authorized for the account during a predefined time period.

15. A computer program product for use in conjunction with a computer system, the computer program product comprising a computer readable storage medium and a computer program mechanism embedded therein, the computer program mechanism comprising:

a reprint authorization module that includes instructions for:

receiving a request from a client computer for authorization to reprint a mail piece that includes a postage indicia, wherein the request includes information identifying an account for printing postage indicia;

evaluating the request, including verifying that said account is valid;

sending a reply to the client computer that includes a reprint authorization when the account is verified and other criteria are satisfied, and otherwise sending a negative reply to the client computer that does not include the reprint authorization;

the request evaluating instructions in the reprint authorization module include instructions for applying the other criteria to the request, the other criteria including a cumulative monetary limit on reprint requests to be authorized for the account during a predefined time period.

16. A computer data signal residing on a medium, the computer data signal carrying program module data for receipt and storage in a computer system, the program module data comprising:

a mail metering module that includes instructions for:

generating a mail piece that includes a postage indicia;

printing the mail piece upon user determination of a mail piece print failure, sending a reprint request to an authorizing authority at a remote location;

upon receiving a reprint authorization from the authorizing authority, enabling the user to print a replacement mail piece with the postage indicia;

preventing reprinting of the mail piece when a reprint authorization is not received from the authorizing authority;

wherein the reprint authorization from the authorizing authority is denied when, upon evaluation of the reprint request by the authorizing authority, the reprint request is determined to not satisfy at least one of a plurality of criteria, the plurality of criteria including an account verification criterion and a reprint limit criterion, the reprint limit criterion comprising a limit on reprint requests to be authorized for an account associated with the user during a predefined time period.

17. A computer program product for use in conjunction with a computer system, the computer program product comprising a computer readable storage medium and a computer program mechanism embedded therein, the computer program mechanism comprising:

a mail metering module that includes instructions for:

generating a mail piece that includes a postage indicia;

printing the mail piece;

upon user determination of a mail piece print failure, sending a reprint request to an authorizing authority at a remote location;

upon receiving a reprint authorization from the authorizing authority, enabling the user to print a replacement mail piece with the postage indicia; and preventing reprinting of the mail piece when a reprint authorization is not received from the authorizing authority;

wherein the reprint authorization from the authorizing authority is denied when, upon evaluation of the reprint request by the authorizing authority, the reprint request is determined to not satisfy at least one of a plurality of criteria, the plurality of criteria including an account verification criterion and a reprint limit criterion, the reprint limit criterion comprising a cumulative monetary limit on reprint requests to be authorized for an account associated with the user.

18. A computer implemented method to enable a user to reprint a postage indicia at a client computer, comprising:

generating a postage indicia;

printing a mail piece with said indicia thereon;

upon user determination of a mail piece print failure, sending a reprint request to an authorizing authority at a remote location;

upon receiving a reprint authorization from the authorizing authority, enabling the user to print a replacement mail piece with the postage indicia; and preventing reprinting of the mail piece when a reprint authorization is not received from the authorizing authority;

wherein the reprint authorization from the authorizing authority is denied when, upon evaluation of the reprint request by the authorizing authority, the reprint request is determined to not satisfy at least one of a plurality of criteria, the plurality of criteria including an account verification criterion and a reprint limit criterion, the reprint limit criterion comprising a cumulative monetary limit on reprint requests to be authorized for an account associated with the user.

* * * * *